United States Patent [19]

Falk

[11] Patent Number: 5,130,051
[45] Date of Patent: Jul. 14, 1992

[54] COMPOSITION TO ENCAPSULATE CHROMIUM, ARSENIC AND OTHER TOXIC METALS IN WASTES

[75] Inventor: Charles D. Falk, Marlboro, N.J.

[73] Assignee: Safe-Waste Systems, Inc., Wanamassa, N.J.

[21] Appl. No.: 636,030

[22] Filed: Jan. 7, 1991

Related U.S. Application Data

[63] Continuation of Ser. No. 221,103, Jul. 19, 1988, abandoned.

[51] Int. Cl.$^5$ ............... B01J 13/00; B01D 21/01; C02F 1/52; C04B 7/02
[52] U.S. Cl. ............... 252/315.5; 106/606; 106/713; 106/739; 106/801; 252/628; 252/631; 210/749; 210/751; 210/720; 210/724
[58] Field of Search ............... 252/628, 631, 315.5; 264/4.1; 210/749, 751, 720, 723; 106/74, 89, 90, 95, 97, 100, 606, 623, 638, 640, 713, 737, 739, 801

[56] References Cited

U.S. PATENT DOCUMENTS

| | | | |
|---|---|---|---|
| H625 | 4/1989 | McDaniel et al. | 252/628 |
| 3,890,244 | 6/1975 | Carlin | 252/631 |
| 3,988,258 | 10/1976 | Curtiss et al. | 252/628 |
| 4,018,679 | 4/1977 | Bolsing | 210/751 |
| 4,028,130 | 6/1977 | Webster et al. | 106/120 |
| 4,110,211 | 8/1978 | Krofchak | 210/116 |
| 4,116,705 | 9/1978 | Chappell | 106/90 |
| 4,118,243 | 10/1978 | Sandesara | 106/109 |
| 4,122,028 | 10/1978 | Iffland et al. | 252/628 |
| 4,256,577 | 3/1981 | Cassella et al. | 210/738 |
| 4,377,508 | 3/1983 | Rothberg | 252/631 |
| 4,379,081 | 4/1983 | Rootham et al. | 252/628 |
| 4,404,105 | 9/1983 | Rysman de Lockerente | 210/710 |
| 4,432,666 | 2/1984 | Frey et al. | 405/129 |
| 4,518,508 | 5/1985 | Conner | 210/751 |
| 4,530,723 | 7/1985 | Smeltzer et al. | 106/90 |
| 4,537,937 | 8/1985 | Cawlfield et al. | 425/417 |
| 4,620,947 | 11/1986 | Carlson | 252/628 |
| 4,632,765 | 12/1986 | De Neef | 210/717 |
| 4,752,397 | 6/1988 | Sood | 210/662 |

FOREIGN PATENT DOCUMENTS

| | | |
|---|---|---|
| 1009775 | 8/1977 | Canada. |
| 55-149673 | 11/1980 | Japan. |
| 56-155680 | 12/1981 | Japan. |
| 62-132579 | 6/1987 | Japan. |

OTHER PUBLICATIONS

Japan Patents Gazette, Nov. 17, 1976, page JP-A-50067280 (Sumitomo).

*Primary Examiner*—Robert L. Stoll
*Assistant Examiner*—John M. Covert
*Attorney, Agent, or Firm*—Gottlieb, Rackman & Reisman

[57] ABSTRACT

A composition for treating toxic metals in solid waste, sludge or slurry is provided. The composition includes a reducing agent such as ferrous sulfate or sodium sulfite and a fixative containing solid calcium oxide or solid magnesium oxide. The composition may also include an acid such as sulfuric acid.

40 Claims, No Drawings

COMPOSITION TO ENCAPSULATE CHROMIUM, ARSENIC AND OTHER TOXIC METALS IN WASTES

This application is a continuation of application Ser. No. 221,103, filed Jul. 19, 1988, now abandoned.

BACKGROUND

This invention relates to compositions which can be used to treat solid waste materials and the like, wastes such as soils, slurries and sludges which are contaminated with toxic metal pollutants and which must be safely discarded or rendered non-hazardous. Specifically, this invention relates to materials which can be used to treat soils and other solid wastes, sludges or slurries which are contaminated with toxic metals and where the toxic metals may be present as constituents in anionic, neutral, or cationic complexes such as chromium, chromate, dichromate, chromite, chromic, lead, plumbic, plumbous, plumbate, plumbite, arsenic, arsenate, arsenite, selenium, selenate, selenite, antimony, antimonite, antimonate, copper, cuprous, cupric, zinc, zincate, molybdenum, molybdic, molybdate, manganese, manganic, manganous, permanganate, vanadium, vanadic, and vanadate.

It is widely recognized that our industrial society produces solid wastes such as soils or sludges or slurries that are contaminated with various contaminants. In particular, toxic metals such as chromium are well known as soil pollutants or contaminants. For example, in areas where chromium ore has been processed, the soil associated therewith may become contaminated with chromium. This poses a health hazard to workers in the area as well as to the general public. It is desirable, therefore, to be able to treat this soil so that it can be disposed of safely without posing a threat to the public health or to the environment.

Other solid wastes, sludges and slurries that contain or are contaminated with chromium and/or other toxic metals are also known and these too must be disposed of safely. This is not always possible using prior art methods since the metals in the waste may still be mobile after treatment and thus are capable of being leached into ground-water.

Accordingly, it is an object of the invention to provide compositions which can be used to treat contaminated soils, sludges, slurries or other solid or semi-solid or semi-liquid wastes.

It is a further object of the invention to provide compositions that are particularly useful in treating soil or waste contaminated with toxic metals such as chromium and arsenic, where the metals may exist in or be capable of forming a higher oxidation state prior to or during treatment.

It is another object of the invention to provide compositions which can be used to treat toxic metals in soil or waste so that said soil or waste can be disposed of in an ecologically safe manner.

Still other objects and advantages of the invention will, in part, be obvious and will, in part, be apparent from the specification.

SUMMARY OF THE INVENTION

Generally speaking, in accordance with the invention, a composition for treating solid waste, sludge or slurry is provided. The composition includes a reducing agent such as ferrous sulfate or sodium sulfite and a fixative containing solid calcium oxide or solid magnesium oxide. The composition may also include an acid such as sulfuric acid.

Preferably, the composition in accordance with the invention is prepared by mixing:

up to about 35% by weight, based on the mass being treated, of a reducing agent (such as ferrous sulfate or sodium sulfite); and 5% to 150% by weight, based on the mass being treated, of a fixative of which a substantial portion is at least solid calcium oxide or solid magnesium oxide The composition may further include the following:

up to about 100% by weight, based on the mass being treated, of an acid (such as sulfuric acid);

between about 0.05 and 5 weight percent of an aqueous silicate solution, with about 5% to 15% potassium oxide and about 10% to 30% silicon dioxide;

up to about 5% by weight, based on the mass being treated, of a catalytic amount of an aqueous, up to 7% sodium borate solution having optionally up to 40 percent of a dispersing/lubricating agent contained therein;

up to about 100 weight percent, based on the waste being treated, of fly ash

An alternative composition for treating solid waste, sludge or slurry is also provided in accordance with the invention The composition includes an anion adsorbent such as SORBPLUS TM (manufactured by Alcoa) or HydroSORB "A" (made by Universal Adsorbents, Inc.) and a fixative containing at least one of solid calcium oxide or solid magnesium oxide. Preferably, the composition is prepared by mixing:

up to about 30% by weight, based on the mass being treated, of an anion adsorbent; and 5% to 100% by weight, based on the mass being treated, of a fixative of which a substantial portion is solid calcium oxide and/or solid magnesium oxide.

The alternative composition may further include:

up to about 100% by weight, based on the mass being treated, of fly ash;

between about 0.05 and 5 percent by weight, based on the mass being treated, of an aqueous silicate solution, with about 5% to 15% potassium oxide and about 10% to 30% silicon dioxide;

up to about 5% by weight, based on the mass being treated, of a catalytic amount of an aqueous, up to 7% sodium borate solution having optionally up to 40 percent of a dispersing/lubricating agent contained therein;

up to about 80% by weight, based on the mass being treated, of a monobasic acid;

up to about 30 percent by weight, based on the mass being treated, of ferric chloride hexahydrate.

In a further composition in accordance with the invention, neither a reducing agent nor an anion adsorbent are used. Instead, the composition includes solid magnesium oxide as a fixative, an aqueous silicate solution containing potassium oxide and silicon dioxide, and optionally a sodium borate solution, dispersing/lubricating agent, and, optionally, fly ash. The composition may further include an acid.

The invention accordingly comprises a composition of matter and a process possessing the characteristics, properties, and the relation of components which will be exemplified in the composition and process hereinafter described, and the scope of the invention will be indicated in the claims.

DETAILS OF THE INVENTION

The composition in accordance with the invention includes a reducing agent in an amount up to about 35 weight percent. Preferably, the reducing agent is present in an amount between about 1 weight percent and 25 weight percent.

The reducing agent is usually selected from the group including ferrous sulfate, sodium bisulfite, sodium sulfite, sodium hydrosulfite, sodium metabisulfite, sodium thiosulfate, and organic reducing agents such as sugar, starch, cellulose, carbohydrates, alcohols and aldehydes.

The composition also includes a fixative containing a substantial portion of at least calcium oxide or magnesium oxide. The fixative is present in an amount between about 5 weight percent and 150 weight percent based on the weight of waste being treated. Preferably, the fixative is present in an amount between about 10 weight percent and 75 weight percent. The fixative is usually selected from the group including portland cement, lime, kiln dust, POZZALIME (a kiln dust sold by Mineral By-Products, Inc., Dayton, Ohio), magnesium oxide, magnesium hydroxide, MAGOX (a magnesium oxide sold by Combustion Engineering, Inc., Valley Forge, Pa.), and fly ash.

The composition may also include an aqueous silicate solution containing potassium oxide and silicon dioxide. More specifically, the silicate solution will include from 5 to 15 percent potassium oxide and from 10 to 30 percent silicon dioxide. The silicate solution is present in an amount between about 0.05 and 5 weight percent, based on the weight of the waste being treated.

The composition will optionally include a catalytic amount of an aqueous sodium borate solution. The sodium borate solution contains up to 7 percent sodium borate and may include up to 40 percent of a dispersing-/lubricating agent. The sodium borate solution is present in an amount up to about 5 weight percent, based on the total weight of the waste being treated.

The dispersing/lubricating agent is an optional component of the borate solution and is usually selected from glycerine, triethanolamine, and ethylene glycol, with glycerine being the preferred dispersing/lubricating agent.

The composition may also include an acid in an amount between about 0.5% and 100% based on the waste being treated. Preferably the acid is present in an amount between about 2% and 35%. The acid is usually selected from the group including sulfuric acid, hydrochloric acid, nitric acid, phosphoric acid, spent sulfuric acid pickling liquor and acetic acid.

In the practice of the invention, it is preferable to keep all parts of the composition separate until just before use. For example, it is normal to mix the reducing agent with water prior to addition to the waste. Preferably, after the dilute reducing agent has been added to or sprayed on the waste, and then mixed with the waste, the acid is added to or sprayed on the blended wetted waste containing the reducing agent and then blended once again.

Alternatively, the acid can be mixed with water prior to addition to the waste and blended with or sprayed on the waste. Preferably, the reducing agent is then added to or sprayed on the waste that has been mixed with the acid and the mixture is blended once again.

Yet another alternative is to mix both the reducing agent and acid with water, adding this acidic reducing agent solution to the waste or spraying it on the waste, and mixing it with the waste. Preferably, after the reducing agent and the acid have been added and mixed with the waste, a period of time ranging from less than a minute to several hours may be required to allow certain desired reactions (such as redox reactions) to proceed to a significant extent.

For example, the reaction rate and/or thermodynamics for the reduction of chromate ion to chromic ion can vary considerably, depending on the pH of the reaction medium. In general, the reduction of chromate ion to chromic ion is much more facile under low pH conditions. In addition, an acidic medium generally promotes the formation of metal cations from metal anionic complexes.

Preferably, after sufficient time has elapsed for the desired reactions to be adequately completed, the high viscosity silicate solution is mixed with water and, preferably, the borate solution is added to the silicate solution. The fixative agent, containing calcium oxide or magnesium oxide is added after the solid waste has been mixed with the silicate solution and optionally the borate solution.

Alternatively, the catalyst, the borate solution, which can be borax with glycerine as a lubricant, is mixed in water and held separately. Just prior to treating the solid waste, both the silicate and borate solution are mixed, diluted further if necessary, and applied to the waste by spraying or other convenient means.

Alternatively, each solution may be sprayed on the contaminated waste individually and mixed thereon by blending. The fixative is added after the waste has been treated with the silicate and borate solution.

Still another alternative is to first mix the silicate and borate solutions with water, add the mixture to or spray it onto the waste, followed by blending it into the waste. Preferably, the acid is added to and mixed into the waste, followed by the addition of the reducing agent and blending it into the waste. After sufficient time has elapsed for the desired reactions to occur, the fixative is added and blended into the waste.

The primary function of the silicate solution, and if used, the borate solution, is to fix toxic metal cations by the formation of insoluble precipitates (e.g. lead metasilicate or zinc metasilicate), and secondarily, to encapsulate the toxic waste particles in an impervious amorphous polysilicate shell.

In a second embodiment of the composition in accordance with the invention, an anion adsorbent is used instead of a reducing agent. The anion adsorbent is present in an amount up to about 30 weight percent, based on the amount of waste being treated. Preferably, the anion adsorbent is present in an amount between about 0.5 weight percent and 20 weight percent. The anion adsorbent is chosen from the group including SORBPLUS TM or HydroSORB "A", as described above.

In the practice of this embodiment of the invention, it is normal to mix the water with the waste, and subsequently add the monobasic acid to the wetted waste. Alternatively, the acid is mixed in water and the resulting dilute acid is added to the waste. The efficiency of the anion adsorbent that is subsequently mixed into the waste may vary substantially with the pH of the waste mixture. Thus, a monobasic acid is added to the waste to reduce the pH of the waste to within a desired pH range, which enhances the efficiency of the anion adsorbent without itself being adsorbed by the adsorbent.

In some instances it may be necessary to add a base, such as a metal hydroxide, or other ingredient to the waste in order to raise the pH of the waste to within the desired range. For example, the optimum efficiency of the anion adsorbent SORBPLUS ™ is at pH=10. At a pH between 8 and 12, SORBPLUS ™ is still effective, but below a pH of 8 and above a pH of 12 its effectiveness is diminished.

If a prior pH adjustment to the waste by acid or base is not necessary, then the anion adsorbent may be mixed with water and the resulting slurry blended into the waste.

After the anion adsorbent and the acid have bee added and mixed with the waste, a period of time ranging from about a minute to several hours may be required to allow the desired adsorption reactions to proceed to a significant extent.

After sufficient time has elapsed for the certain desired anion adsorptions to be sufficiently complete, the high viscosity silicate solution is mixed with water. Preferably, the borate solution is then added to the silicate solution. Among the purposes of adding the silicate solution and borate solution is the desirability of forming insoluble silicate compounds with the soluble toxic metal cations and the potential for encapsulating the anion adsorbent and the toxic metal compounds in a glass-like impervious polymeric shell.

The fixative agent, containing calcium oxide or magnesium oxide, is added after the solid waste has been mixed with silicate solution and borate solution.

Alternatively, the catalyst, the borate solution, which can be borax with glycerine as a lubricant, is mixed in water and held separately.

Just prior to treating the solid waste, the silicate and borate solutions are mixed, diluted further if necessary, and applied to the waste by spraying or other convenient means. Alternatively, each part may be sprayed on the contaminated waste individually and mixed thereon by blending.

Still another alternative is to first mix the silicate and borate solution with water, and then add the mixture to or spray it onto the waste, followed by blending of it into the waste. Preferably, the acid is added to and mixed into the waste, followed by the addition of the anion adsorbent, which is blended into the waste. After sufficient time has elapsed for the adsorption of the anions to occur, the fixative is added and blended into the waste.

The rate and thermodynamics of anion adsorption depends on the adsorbent, anionic species, temperature and pH. For example, the anion adsorbent SORBPLUS TM exhibits the following selectivity for anionic metal complex adsorption at a pH=10:

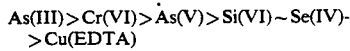

Thus, arsenite will be preferentially adsorbed in the presence of chromate; chromate will be preferentially adsorbed in the presence of arsenate; arsenate will be preferentially adsorbed in the presence of selenate or selenite; and the Cu(EDTA) complex (where EDTA=ethylenediaminetetraacetate anion) will have the lowest tendency of the six anionic species to adsorb on SORBPLUS ™.

Also, if a waste contains a high concentration of toxic leachable As(III) and/or As(V) and no or low concentrations of other toxic anionic metal complexes, a prudent treatment would include the use of ferric chloride hexahydrate to precipitate the As(V) as insoluble ferric orthoarsenate. Where the waste contains a significant fraction of As(III), the ferric ion may also serve to oxidize the As(III) (e.g. arsenite) to As(V) (e.g. arsenate), which is subsequently precipitated by the excess ferric ion as ferric orthoarsenate.

Commercially, there are a number of areas generating high chromium, arsenic, or other toxic metal wastes. These include chromium ore processing plants, paint manufacturers, tanneries, herbicide, insecticide and fungicide manufacturers, plating facilities, chemical plants, facilities that remove paint and phosphoric acid plants. In these areas, chromium, arsenic or other toxic metals are used or these metals end up in the waste and/or soil surrounding the facility. From time to time, it is necessary to dispose of this contaminated waste or soil in an ecologically safe manner since human contact with the contaminated waste or soil is undesirable.

In the past, it has been the practice of these industries to dispose of the waste and/or contaminated soil within various landfill sites. However, as more and more of these sites become filled, this procedure is ecologically unsound. As a result, there is a pressing need to find a quick, easy and economical method for treating the waste or soil which contains the contaminants so that the waste or soil may be disposed of without danger of leaching the contaminants into groundwater. The composition of the invention is suitable for this purpose.

In the practice of this invention, it is preferable to keep all the parts separate. A solution of aqueous silicate (e.g. Kasil-6, about 12.5% potassium oxide and about 26.3% silicon dioxide, viscosity of approximately 1050 centipoise, pH of 11.7, manufactured by PQ Corporation, Valley Forge, Pa.) is first prepared.

The catalyst (e.g., an aqueous up to 7 percent sodium borate solution with a small amount (up to 40%) of dispersing/lubricating agent, e.g., glycerine) is also made up separately.

Just prior to use, the silicate and borate solution can be mixed. Alternatively, one may mix these ingredients within the soil to be treated. By keeping the various ingredients separate prior to use, premature reaction is prevented.

Some dilution may be necessary in order that the mixture become sprayable. For example, dilutin of the combined material of from about 1:1 to about 100:1 with water is useful.

Spraying is a preferred mode of application although any mode can be used. The mixture is applied to the granulated soil or waste, which is churned to expose all surfaces to the mixture. However, it is desirable that the two solutions not be added to the soil or waste until the reducing agent and/or acid have been added and mixed with the soil or waste.

It is also desirable that the acid be the first ingredient to be added to the waste. However, the acid should be added after the waste or soil has been "wetted" with water. Alternatively, the acid may be diluted with water before it is added to the waste.

It is further desirable that the reducing agent be the second ingredient to be added to the waste. The reducing agent may be diluted with water prior to being added and mixed with the waste. After sufficient time has elapsed for the desired redox reactions with the toxic metals to occur (typically, this time may be less than a minute to several hours), the silicate and borate solutions are added and mixed with the waste.

It is also desirable that the optional ingredient fly ash be added and mixed with the waste, followed by the addition of the fixative (e.g. MAGOX 93.5, about 93.5% magnesium oxide, manufactured by Combustion Engineering, Inc. of Valley Forge, Pa.). Other sources of the fixative agent include, for example, cement, lime, kiln dust, POZZALIME (sold by Mineral By-Products, Inc. of Dayton, Ohio), and magnesium hydroxide. Optionally, the reducing agent may be added first, followed, by the acid. Also, the fly ash and fixative can be mixed prior to being added to the soil or waste.

After drying, the solid yields much lower concentrations of leachable chromium, arsenic, lead and other toxic metals and is thus suitable for disposal.

An alternate composition for treating hazardous waste substitutes the monobasic acid and anion adsorbent for the dibasic acid and reducing agent respectively. For example, it is preferred that the first ingredient to be added to the waste is the monobasic acid, (e.g. concentrated hydrochloric acid). It is also preferred that the second ingredient to be added to the waste is the anion adsorbent (e.g. SORBPLUS TM, manufactured by Alcoa, Pittsburgh, Pa.). After sufficient time has elapsed to allow for the adsorption of the toxic metals onto the anion adsorbent (typically from less than a minute to several hours are required), the silicate solution, borate solution are then added.

In this alternative embodiment, the fixative agent almost always is the last ingredient to be added and mixed with the waste. Sources of fixative include magnesium oxide, magnesium hydroxide, cement, lime, kiln dust, POZZALIME and MAGOX as discussed above.

After drying, the solid exhibits much lower concentrations of leachable toxic metals such as chromate, arsenate, and selenite, and, therefore, can be disposed of safely and ecologically.

Optionally, the anion adsorbent may be added first, followed by the monobasic acid. Also, the fly ash and fixative, respectively, can be mixed prior to being added to the soil or waste.

In still a further embodiment the composition of the invention need not include either a reducing agent or an anion adsorbent. Instead, the composition includes substantially solid magnesium oxide as a fixative and silicate solution as described above. The magnesium oxide is present in an amount between about 5 weight percent and 100 weight percent and the silicate solution is present in an amount between about 0.05 weight percent and 5 weight percent. The silicate solution includes 5 to 15% potassium oxide and 10 to 30% silicon dioxide.

In this embodiment, it may also be desirable to add a sodium borate solution as described above in an amount up to about 5 weight percent and fly ash. It may further be desirable to add an acid in an amount up to about 100 weight percent.

Significantly, soils and wastes treated with the composition of the invention typically exhibit increased compressive strength and may be useful in construction materials.

To further illustrate the invention, reference is made to the following examples:

EXAMPLE 1

The following solutions were prepared and employed with the following parts (solids):

| Solution A | |
|---|---|
| Silicate (about 12.5% potassium oxide and about 26.3% silicon dioxide, KASIL-6, PQ Corporation Valley Forge, PA) This solution equaled about 5 gallons. | 57.5 lbs. |
| Solution B | |
| Borax | 120.0 g. |
| Glycerine | 720.0 ml. |
| Water to make | 5.0 gal. |

This solution was stirred until completely mixed.

| Solution C | |
|---|---|
| Water | 150 g. |
| Concentrated Sulfuric Acid (about 96.5% sulfuric acid by assay) This solution was thoroughly mixed and equaled about 170 ml of about a 25 wt. % sulfuric acid solution. | 50 g. |
| Part D | |
| Ferrous Sulfate Heptahydrate | |
| Part E | |
| Class F Fly Ash | |
| Part F | |
| Magnesium Oxide | |

In accordance with the invention, a sample of waste was taken from an actual paint manufacturing plant. In this plant, the paint is filtered to remove any lumps or foreign material. Since certain pigments contain a large fraction of chromium, the filters become contaminated with the chromium pigments. The filters thus become a hazardous waste contaminated with chromium which must be treated and disposed of periodically to protect workers at the plant site and to prevent the leaching of the chromium into groundwater.

In this particular case, the chromium contaminated filters consisted of hair-like fibers containing dry solid pigment particles. The contaminated filters, which weighed 44.69 g., were treated with 45.26 g. of Solution C (25 wt. % sulfuric acid). A sufficient quantity of Part D, 5.35 g. of ferrous sulfate heptahydrate, was added, and the mixture blended until all of the ferrous sulfate crystals dissolved.

Approximately equal volumes of Solution A and Solution B were mixed. Particularly, 5.80 g. of Solution A was mixed with 4.20 g. of Solution B, and 0.24 g. of this mixture was added to the paint filter waste approximately 5 minutes after Part D had been added. The mixture was blended once again, after which 26.80 g. of Part E (Class F Fly Ash) was added and mixed into the waste. Finally, 5.37 g. of Part F (magnesium oxide) was added and blended into the waste until all of the ingredients (filters, Solution A, Solution B, Solution C, Part D, Part E, and Part F) were thoroughly mixed The final mixture was allowed to dry and then analyzed for soluble chromium using the Extraction Procedure (EP) Toxicity Test published in the Federal Register, Vol. 49, No. 209, Oct. 26, 1984, and in EPA Publication SW-846, 3rd Edition, November, 1986. In this case, the following results were achieved:

| Sample | Chromium (VI) in mg/l | Chromium (III) in mg/l | Total Chromium in mg/l |
|---|---|---|---|
| Control - No treatment | 12.5 | 4.5 | 17.0 |
| Treated | — | — | Less than |

-continued

| Sample | Chromium (VI) in mg/l | Chromium (III) in mg/l | Total Chromium in mg/l |
| --- | --- | --- | --- |
| | | | 0.1 |

EXAMPLE 2

Paint filters consisting of woven paper-like fabric were contaminated with solid pigment particles containing leachable chromium. This waste originated from another paint manufacturing facility and contained a total of 110 mg/l leachable chromium based on the EP Toxicity Test. The paint filters were treated with a composition in accordance with the invention as follows:

53.40 g. of paint filters contaminated with chromium(VI)
53.43 g. of Solution C (same as in Example 1)
6.42 g. of Part D (same as in Example 1)
Approximately 5 minutes was allowed for the reduction of chromium(VI)
0.16 g. of Solution A (same as in Example 1)
0.12 g. of Solution B (same as in Example 1)
32.04 g. of Part E (same as in Example 1)
6.41 g. of Part F (same as in Example 1)

After treatment with the above composition, the leachable chromium in the waste was reduced to an almost insignificant level as shown by the following EP Toxicity Test results:

| Sample | Chromium (VI) in mg/l | Chromium (III) in mg/l | Total Chromium in mg/l |
| --- | --- | --- | --- |
| Control - No treatment | 1.0 | 109.0 | 110.0 |
| Treated | — | — | Less than 0.1 |

Accordingly, the treatment of the paint filter waste in accordance with the invention rendered this waste non-hazardous to the environment and safe for disposal.

EXAMPLE 3

To further demonstrate the efficacy of the inventive composition to treat chromium contamination in still another waste, a sample of electric arc furnace dust containing 1.38 mg/l chromium on the EP Toxicity Test was treated with the following composition:

300 g. of electric arc furnace dust contaminated with chromium.
0.87 g. of Solution A (same as in Example 1)
0.63 g. of Solution B (same as in Example 1)
285 g. of tap water,
75 g. of Solution C (concentrated sulfuric acid, about 96.5% sulfuric acid)
18 g. of Part D (same as in Example 1)

The mixture was allowed to stand for about 1.5 hours and the following was then added:
181 g. of Part E (same as in Example 1)
36 g. of Part F (same as in Example 1)

After treatment, the leachable chromium as determined by the EP Toxicity Test was only 0.06 mg/l.

EXAMPLE 4

The efficacy of the composition of the invention is further demonstrated by treatment of a baghouse dust containing 31 mg/l soluble chromium(VI) and various other toxic metals as follows:

200 g. of baghouse dust containing Cr, Pb, Cd, Cu and Zn
95 g. of tap water
8.00 g. of Part D (same as in Example 1)

The mixture was allowed to stand for 20 minutes and the following was then added:
1.16 g. of Solution A (same as in Example 1)
0.84 g. of Solution B (same as in Example 1)
40.0 g. of Part E (same as in Example 1)
120.0 g. of Part F - Portland Cement, Type I (Saylor's Type I, Coplay Cement Co., Nazareth, Pa.)

The final mixture was allowed to dry and was then analyzed for soluble toxic metals using the California Administrative Code-Waste Extraction Test ("CAC - WET" Test), Title 22, Chapter 30, Article II, Jan. 12, 1985. In this example, the following results were obtained:

| Toxic metal in mg/l | Control (No Treatment) | Treated (Per Above) |
| --- | --- | --- |
| Chromium (III) | 21.3 | 3.9 |
| Chromium (VI) | 31.0 | 9.6 |
| Lead | 230 | 18 |
| Cadmium | 22.1 | 0.7 |
| Copper | 24.7 | 9.6 |
| Zinc | 7000 | 47 |

EXAMPLE 5

This treatment used a similar composition as that described in Example 4, except that the following ingredients were employed:

200 g. of baghouse dust (same as in Example 4)
80.0 g. of Part D (approximately 12.5 weight % sodium sulfite dissolved in water The mixture was allowed to stand for 30 minutes and the following was added:
1.16 g. of Solution A (same as in Example 1)
0.84 g. of Solution B (same as in Example 1)
10.0 g. of LIGNOSITE (calcium lignosulfonate solution, sold by Georgia-Pacific Corp. of Bellingham, Wash.)
40.0 g. of Part E (same as in Example 1)
120.0 g. of Part F (same as in Example 4)

After the mixture was allowed to dry and analyzed for soluble toxic metals by the "CAC-WET" Test, the following results were achieved:

| Toxic metal in mg/l | Control (No Treatment) | Treated (Per Above) |
| --- | --- | --- |
| Chromium (III) | 21.3 | 12 |
| Chromium (VI) | 31.0 | 3.2 |
| Lead | 230 | 21 |
| Cadmium | 22.1 | 0.6 |
| Copper | 24.7 | 11 |
| Zinc | 7000 | 32 |

EXAMPLE 6

To further demonstrate the efficacy of the composition of the invention to treat toxic metals, grit blast dust which leached 42 mg/l chromium on the EP Toxicity Test was treated with the following composition:

50.0 g. of grit blast dust contaminated with
50.0 g. of Solution C (same as in Example 1)

The mixture was allowed to stand for about 30 minutes and the following was added:
 0.15 g. of Solution A (same as in Example 1)
 0.11 g. of Solution B (same as in Example 1)
 30.0 g. of Part E (same as in Example 1)
 6.0 g. of Part F (same as in Example 1)

After drying, the resulting mixture contained less than 0.1 mg/l chromium (using the EP Toxicity Test), which is an almost insignificant level of leachable chromium.

EXAMPLE 7

To further illustrate the invention the following Solution C, Part D and Part F were substituted in place of Solution C, Part D and Part F respectively of Example 3:

Solution C

Concentrated Hydrochloric Acid (about 37.9% HCl by assay)

Part D

HydroSORB "A" Universal Adsorbents, Inc., Atlanta, Ga.)

Part F

MAGOX 93.5 (Combustion Engineering, Inc., Valley Forge, Pa.)

A sample from the same electric arc furnace dust which yielded 1.38 mg/l chromium on the EP Toxicity Test in Example 3 was treated with the following composition:
 200 g. of electric arc furnace dust (same as in Example 3)
 85 g. of tap water
 27 g. of Solution C (concentrated hydrochloric acid)
 4 g. of Part D (HydroSORB "A")

The mixture was allowed to stand for about 30 minutes.
 0.60 g. of Solution A (same as in Example 1)
 0.44 g. of Solution B (same as in Example 1)
 120 g. of Part E (same as in Example 1)
 24 g. of Part F (MAGOX 93.5)

After drying, the mixture contained only 0.15 mg/l leachable chromium on the EP Toxicity Test, thus demonstrating the efficacy of the alternate composition in this invention.

EXAMPLE 8

To further illustrate the efficacy of the invention the following ingredients were used to treat another sample of the electric arc furnace dust used in Examples 3 and 7:
 300 g. of electric arc furnace dust (same as in Example 7)
 220 g. of tap water
 0.87 g. of Solution A (same as in Example 1)
 0.63 g. of Solution B (same as in Example 1)
 40 g. of Solution C (same as in Example 7)
 60 g. of Part D (same as in Example 7)

Let the mixture stand for about 30 minutes and then add:
 0.87 g. of Solution A (same as in Example 1)
 0.63 g. of Solution B (same as in Example 1)
 180 g. of Part E (same as in Example 1)
 36 g. of Part F (same as in Example 1)

Whereas the electric arc furnace dust gave 1.38 mg/l chromium on the EP Toxicity Test before the treatment, the same test after the treatment yielded only 0.05 mg/l

EXAMPLE 9

The following is yet another demonstration of the efficacy of the invention, where the alternate composition is employed to treat an electric arc furnace dust contaminated with lead:
 200 g. of electric arc furnace dust contaminated with lead
 171 g. of tap water
 55 g. of Solution C (same as in Example 7)
 4.5 g. of Part D (same as in Example 7)

The mixture was allowed to stand for about 50 minutes:
 1.16 g. of Solution A (same as in Example 1)
 0.84 g. of Solution B (Same as in Example 1)
 61 g. of Part E (same as in Example 1)
 180 g. of Part F - Portland Cement, Type IA, Air-Entraining (Keystone Portland Cement, Bath, Pa.)

Before the treatment, the electric arc furnace dust exhibited 160 mg/l lead on the EP Toxicity Test. After treatment, the EP Toxicity Test yielded only 0.8 mg/l lead.

EXAMPLE 10

Still another illustration of the efficacy of the composition of the invention to treat a hazardous waste contaminated with chromium is as follows:
 200 g. of baghouse dust (same as in Example 4)
 64 g. of tap water
 4.00 g. of Part D (same as in Example 7)

After mixing, the mixture was allowed to stand for about 30 minutes and then the following was added:
 0.58 g. of Solution A (same as in Example 1)
 0.42 g. of Solution B (same as in Example 1)
 90.0 g. of Part E (same as in Example 1)
 30.0 g. of Part F (same as in Example 7)

After the final mixture, was dried, it was analyzed for soluble chromium(VI) by the "CAC-WET" Test, exhibiting a concentration of 1.86 mg/l chromium(VI). This concentration is substantially lower than the 31.0 mg/l of leachable chromium(VI) from the untreated baghouse dust using the "CACWET" Test.

EXAMPLE 11

Another illustration of the invention which demonstrates the efficacy of the composition of the invention to treat hazardous metals in waste is as follows:
 100 g. of grit blast dust (same as in Example 6)
 91 g. of tap water
 20 g. of Part D (same as in Example 7)

The mixture was allowed to stand for about 10 minutes and the following was added:
 0.29 g. of Solution A (same as in Example 1)
 0.21 g. of Solution B (same as in Example 1)
 40 g. of Part F - Lime, Type SA (Corson Lime Co., Plymouth Meeting, Pa.)

The results from the EP Toxicity Test before the treatment showed that chromium was being leached from the waste in the amount of 42 mg/l. After the treatment, the EP Toxicity Test revealed that leachable chromium was only 12 mg/l.

EXAMPLE 12

The efficacy of the invention may be further demonstrated by the following treatment of electric arc furnace dust contaminated with leachable lead and cadmium:

200 g. of electric arc furnace dust contaminated with lead and cadmium
111 g. of tap water
0.59 g. of Solution A (same as in Example 1)
0.42 g. of Solution B (same as in Example 1)
120 g. of Part E (same as in Example 1)
48 g. of Part F (same as in Example 7)

In this case, the following EP Toxicity Test results were obtained for lead and cadmium:

| SAMPLE | Lead (mg/L) | Cadmium (mg/L) |
|---|---|---|
| Control - No Treatment | 460 | 27 |
| Treated - Per Above | 0.36 | 0.02 |

EXAMPLE 13

The results from the treatment of another electric arc furnace dust contaminated with lead and chromium further demonstrate the efficacy of the invention to encapsulate hazardous metals in a waste. In this example, the following ingredients were used:

200 g. of electric arc furnace dust contaminated with lead and chromium
114 g. of tap water
0.58 g. of Solution A (same as in Example 1)
0.42 g. of Solution B (same as in Example 1)
120 g. of Part E (same as in Example 1)
48 g. of Part F (same as in Example 7)

The untreated and treated samples of electric arc furnace dust gave the following EP Toxicity Test results for lead and chromium:

| SAMPLE | Lead (mg/L) | Chromium (mg/L) |
|---|---|---|
| Control - No Treatment | 57 | 0.17 |
| Treated - Per Above | 0.03 | 0.10 |

EXAMPLE 14

A demonstration of the efficacy of the composition of the invention for encapsulating lead and chromium in another waste is as follows:

200 g. of electric arc furnace dust contaminated with lead and chromium
75 g. of tap water
0.60 g. of Solution A (same as in Example 1)
0.44 g. of Solution B (same as in Example 1)
120 g. of Part E (same as in Example 1)
48 g. of Part F (same as in Example 7)

The following EP Toxity Test results were obtained for the waste sample before and after the treatment:

| SAMPLE | Lead (mg/L) | Chromium (mg/L) |
|---|---|---|
| Control - No Treatment | 296 | 0.66 |
| Treated - Per Above | 0.79 | 0.09 |

EXAMPLE 15

A further demonstration of the efficacy of the invention is illustrated by the use of the following composition to treat a soil that is contaminated with chromate waste originating from the processing of chromium ore:

200 g. of soil contaminated with chromate
71 g. of tap water
31.2 g. of Solution C (same as in Example 3)
32 g. of Part D (same as in Example 1)

Approximately one hour was allowed for the chemical reduction of the chromate ion and the following was then added:

0.58 g. of Solution A (same as in Example 1)
0.42 of Solution B (same as in Example 1)
120 g. of Part E (same as in Example 1)
24 g. of Part F (same as in Example 7)

An EP Toxicity Test on the soil prior to the treatment showed that 108 mg/l chromium was leached from the soil. However, after treatment, only 3.30 mg/l chromium was extracted into the leachate using the EP Toxicity Test.

EXAMPLE 16

The efficacy of the composition of the invention to treat a waste containing, arsenic is illustrated by the following example. The waste is a filter cake produced from the manufacture of phosphoric acid. When the untreated waste is subjected to the EP Toxicity Test, it yields a leachate containing approximately 46 mg/l arsenic. The following composition was used:

200 g. of filter cake waste contaminated with arsenic from a phosphoric acid plant
260 g. of tap water
0.58 g. of Solution A (same as in Example 1)
0.42 g. of Solution B (same as in Example 1)
50 g. of Part F (same as in Example 7)
50 g. of Part E (same as in Example 1)
4.0 g. of Part D (same as in Example 1)

After treatment with the above composition, the leachable arsenic in the waste was reduced to 1.7 mg/l, using the EP Toxicity Test.

EXAMPLE 17

Another example of the effectiveness of the composition of the invention to treat a waste contaminated with arsenic is illustrated. In this treatment, the same waste and composition as described in Example 16 were used, except that 12.0 g. of ferric chloride hexahydrate was used in place of the 4.0 g. of Part D (ferrous sulfate heptahydrate). Whereas the filter cake waste from the phosphoric acid plant gave approximately 46 mg/L arsenic on the EP Toxicity Test before the treatment, after the treatment the EP Toxicity Test yielded a leachate containing less than 0.5 mg/l arsenic.

It will thus be seen that the objects set forth above, among those apparent from the preceding description, are efficiently attained and, since changes may be made in carrying out the above process and in the composition set forth without departing from the spirit and scope of the invention, it is intended that all matter contained herein shall be interpreted as illustrative and not in a limiting sense.

It is also understood that the following claims are intended to cover all of the generic and specific features of the invention and all statements of the scope thereof which, as a matter of language, might be said to fall therebetween.

Particularly, it is understood that ingredients or compounds recited in the singular are intended to include compatible mixtures wherever appropriate.

What is claimed is:

1. A composition for encapsulating toxic metals contained in a non-radioactive solid waste, sludge or slurry in which the toxic metals may exist or be capable of existing in a state having the tendency to leach into ground water comprising:

a precipitating agent for the toxic metals comprising an aqueous silicate solution in an amount between about 0.05 and 5 weight percent, said silicate solution comprising between about 5 and 15 percent of an alkali metal oxide and between about 10 and 30 percent silicon dioxide; and a fixative comprising substantially solid magnesium oxide in an amount between about 5 and 100 weight percent;

wherein the weight percents are based on the solid waste, sludge or slurry being treated.

2. The composition of claim 1, further comprising an aqueous sodium borate solution in an amount up to about 5 weight percent, said sodium borate solution comprising sodium borate in an amount up to about 7 percent.

3. The composition of claim 2, wherein said sodium borate solution further comprises a dispersing/lubricating agent in an amount up to about 40 percent.

4. The composition of claim 3, wherein said dispersing/lubricating agent is selected from the group consisting of glycerine, triethanolamine and ethylene glycol.

5. The composition of claim 1, further comprising fly ash in an amount up to about 100 weight percent.

6. The composition of claim 1, further comprising an acid in an amount up to about 100 weight percent.

7. The composition of claim 1, further comprising ferric chloride hexahydrate in an amount up to about 30 weight percent.

8. The composition of claim 6, wherein the acid is selected from the group consisting of sulfuric acid, hydrochloric acid, nitric acid, phosphoric acid, spent sulfuric acid pickling liquor and acetic acid.

9. A process for encapsulating toxic metals contained in a non-radioactive solid waste, sludge or slurry in which the toxic metals may exist or be capable of existing in a state having the tendency to leach into ground water, wherein said process comprises the steps of:

mixing said solid waste, sludge or slurry with a precipitating agent for the toxic metals comprising an aqueous silicate solution in an amount between about 0.05 and 5 weight percent, said silicate solution comprising between about 5 and 15 percent alkali metal oxide and between about 10 and 30 percent silicon dioxide; and mixing said waste, sludge or slurry containing the aqueous silicate solution with a fixative material in an amount between about 5 and 100 weight percent, said fixative comprising substantially solid magnesium oxide;

wherein said weight percents are based on the solid waste, sludge or slurry being treated.

10. The process of claim 9, further comprising mixing said waste with an aqueous sodium borate solution in an amount up to about 5 weight percent, said borate solution comprising sodium borate in an amount up to about 7 percent.

11. The process of claim 10, wherein said sodium borate solution further comprises a dispersing/lubricating agent in an amount up to about 40 percent.

12. The process of claim 9, further comprising mixing said waste with fly ash in an amount up to about 100 weight percent.

13. The process of claim 9, further comprising mixing said waste with an acid in an amount up to about 100 weight percent.

14. The process of claim 9, further comprising mixing said waste with ferric chloride hexahydrate in an amount up to about 30 weight percent.

15. The process of claim 10, wherein said silicate solution and said sodium borate solution are diluted from about 1:1 to about 100:1 before mixing with said waste.

16. The process of claim 3, wherein said acid is diluted from about 1:1 to about 100:1 before mixing with said waste.

17. The process of claim 4, wherein said ferric chloride hexahydrate is dissolved in water and diluted from about 0.5:1 to about 100:1 before mixing with said waste.

18. A composition for encapsulating toxic metals contained in a non-radioactive solid waste, sludge or slurry in which the toxic metals may exist or be capable of existing in a state having the tendency to leach into ground water comprising:

at least one of an anion adsorbent in an amount no greater than about 30 weight percent and reducing agent in an amount no greater than about 35 weight percent; and a fixative in an amount between about 5 and 150 weight percent, said fixative comprising a substantial portion of magnesium oxide;

wherein the weight percents are based on the solid waste, sludge or slurry being treated.

19. The composition of claim 18, further comprising an acid in an amount up to about 100 weight percent.

20. The composition of claim 18, further comprising an aqueous silicate solution in an amount between about 0.05 and 5 weight percent, said silicate solution comprising between about 5 and 15 percent alkali metal oxide and between about 10 and 30 percent silicon dioxide.

21. The composition of claim 18, further comprising an aqueous sodium borate solution in an amount up to about 5 weight percent, said sodium borate solution comprising sodium borate in an amount up to about 7 percent.

22. The composition of claim 21, wherein said sodium borate solution further comprises a dispersing/lubricating agent in an amount up to about 40 weight percent.

23. The composition of claim 22, wherein said dispersing/lubricating agent is selected from the group consisting of glycerine, triethanolamine and ethylene glycol.

24. The composition of claim 18, further comprising ferric chloride hexahydrate in an amount up to about 30 weight percent.

25. The composition of claim 18, further comprising fly ash in an amount up to about 100 weight percent.

26. The composition of claim 25, further comprising ferric chloride hexahydrate in an amount up to about 30 weight percent.

27. The composition of claim 18, wherein the reducing agent is selected from the group consisting of ferrous sulfate, sodium bisulfite, sodium sulfite, sodium hydrosulfate, sodium metabisulfite, sodium thiosulfate and organic reducing agents selected from the group consisting of sugar, starch, cellulose, alcohols and aldehydes.

28. The composition of claim 19, wherein the acid is selected from the group consisting of sulfuric acid, hydrochloric acid, nitric acid, phosphoric acid, spent sulfuric acid pickling liquor and acetic acid.

29. A process for encapsulating toxic metals contained in a non-radioactive solid waste, sludge or slurry in which the toxic metals may exist or be capable of existing in a state having the tendency to leach into ground water, wherein said process comprises the steps of:
   mixing said waste with at least one of an anion adsorbent in an amount no greater than about 30 weight percent and a reducing agent in an amount no greater than about 35 weight percent; and
   mixing said waste, sludge or slurry containing at least one of the anion adsorbent and the reducing agent with a fixative material in an amount between about 5 and 150 weight percent, said fixative material comprising a substantial portion of magnesium oxide;
   wherein said weight percents are based on the solid waste, sludge or slurry being treated.

30. The process of claim 29, wherein said process further comprises mixing said waste with an acid in an amount up to about 100 weight percent.

31. The process of claim 29, further comprising mixing said waste with fly ash in an amount up to about 100 weight percent.

32. The process of claim 9, further comprising mixing said waste with an aqueous silicate solution in an amount between about 0.05 and 5 weight percent, said silicate solution comprising between about 5 and 15 percent of an alkali metal oxide and between about 10 and 30 percent silicon dioxide.

33. The process of claim 32, further comprising mixing said waste with an aqueous sodium borate solution in a amount up to about 5 weight percent, said borate solution comprising sodium borate in an amount up to about 7 percent.

34. The process of claim 33, wherein said sodium borate solution further comprises a dispersing/lubricating agent in an amount up to about 40 percent.

35. The process of claim 29, wherein said reducing agent is dissolved in water and diluted from about 1:1 to about 100:1 before mixing with said waste.

36. The process of claim 29, further comprising mixing said waste with ferric chloride hexahydrate in an amount up to about 30 weight percent.

37. The process of claim 29, wherein said anion adsorbent is suspended in water and diluted from about 1:1 to about 100:1 before mixing with said waste.

38. The process of claim 30, wherein said acid is diluted from about 1:1 to about 100:1 before mixing with said waste.

39. The process of claim 33, wherein said silicate solution and said sodium borate solution are diluted from about 1:1 to about 100:1 before mixing with said waste.

40. The process of claim 36, wherein said ferric chloride hexahydrate is dissolved in water and diluted from about 0.5:1 to about 100:1 before mixing with said waste.

* * * * *